United States Patent [19]

Perlo et al.

[11] Patent Number: 5,817,396

[45] Date of Patent: Oct. 6, 1998

[54] ANTIREFLECTION SURFACE HAVING A PREDETERMINED ROUGHNESS, PARTICULARLY FOR MOTOR-VEHICLE DASHBOARDS

[75] Inventors: Piero Perlo, Sommariva Bosco; Sabino Sinesi, Piossasco; Luca Sardi, Sant'Ambrogio, all of Italy

[73] Assignee: C.R.F. Societa' Constorile per Azioni, Turin, Italy

[21] Appl. No.: 719,462

[22] Filed: Sep. 25, 1996

[30] Foreign Application Priority Data

Sep. 26, 1995 [IT] Italy .................................. TO95A0763

[51] Int. Cl.[6] ............................. B32B 3/30; B62D 25/14; H01L 31/0236
[52] U.S. Cl. .......................... 428/141; 428/156; 428/913; 359/885; 359/833; 359/834; 136/256; 296/70
[58] Field of Search ..................................... 428/141, 913, 428/156; 359/885, 833, 834; 136/256; 296/70

[56] References Cited

U.S. PATENT DOCUMENTS

| 4,252,865 | 2/1981 | Gilbert et al. | 428/611 |
| 4,634,223 | 1/1987 | Ishii | 350/286 |
| 4,802,737 | 2/1989 | Oenton | 350/166 |
| 4,944,986 | 7/1990 | Zuel | 428/156 |

*Primary Examiner*—William P. Watkins, III
*Attorney, Agent, or Firm*—Sughrue, Mion, Zinn, Macpeak & Seas, PLLC

[57] ABSTRACT

An antireflection surface having a predetermined roughness so as to keep the reflectivity of incident radiation low. A profile with projections having a height which is an integer multiple of the radiation wavelength can trap the radiation irrespective from its polarization and also at large angles of incident light.

6 Claims, 3 Drawing Sheets

ANTIREFLECTION SURFACE HAVING A PREDETERMINED ROUGHNESS, PARTICULARLY FOR MOTOR-VEHICLE DASHBOARDS

BACKGROUND OF THE INVENTION

The present invention relates to a surface having a tridimensional profile with a roughness which is predetermined so as to keep the reflection factor of incident radiation at minimum.

The problem of reducing the reflection factor of materials, particularly plastic materials, which are used for example in motor-vehicle dashboards, has been approached in a number of ways.

The most immediate method lies in the choice of materials having a low reflection factor, such as plastic materials of black or dark grey colour, which are commonly used in motor-vehicle dashboards. In spite of the dark colour, the specular reflection factor at a usual incidence is rarely lower than 6%, also with a surface which is not smooth and has a leather-like appearance. Due to the random roughness of such a surface, the portion of light reflected by diffusion prevails on the portion having a specular reflection; however this latter portion increases when the angle of incident light increases. Sometimes, a textile like appearance is given to the surface in order to decrease the specular reflection portion. Angles of incident light greater than 50° are typical in a motor-vehicle dashboard. Therefore, in spite of the choice of a plastic material of dark colour, and the random roughness and the textile-like appearance, the portion of light which is reflected towards the windshield is relevant and troublesome for the driver. The visual disturbance which is caused by the light reflected towards the windshield poses limitations to the shape of the dashboard and generally to the appearance thereof.

Another known method lies in applying an antireflection coating on the surface. In this case, since the angles of incident radiation may be very high and variable, more layers would be needed. Beside this basic problem, this solution sometimes is not used also because of the complication and the large size of the parts which would require this coating. At any rate, the surface coatings would introduce additional costs.

Antireflection surfaces are also known (P. B. Clapman and M. C. Hutley, "Reduction of lens reflection by the moth eye principle", Nature (London), pages 244, 281–282 (1973) and U.S. Pat. No. 5,007,708 issued on Apr. 16, 1991 to Gaylord et al.), which are indicated by terms such as "SUBWAVELENGTH STRUCTURED SURFACES" (SWS) or "Moth eye structures" or also "ZERO ORDER GRATINGS" which are applied as antireflection surfaces, or for polarization control, or for beam splitting and also for colour control. Examples of such structures may by found in nature and are very important for their antireflection features in the cornea of some types of insects, for providing the colour of some types of butterflies and for the absorbing or selective reflection features of some leaves or plants. The mathematical analysis of the features of these surfaces is limited to cases having a particular periodical profile. These structures have features which strongly depend upon the wavelength, the polarization status and the angle of the incident radiation beam The features of the material affect the final optical features only to a minimum extent; these features are almost entirely determined by the surface profile which has crests with a height which is a fraction of the radiation wavelength. With the so called zero order surfaces, a wavelength selecting behaviour is achieved so that it is possible to leave the wave front of a light beam which passes for example through a glass or plastic plate unchanged.

Solutions of antireflection surfaces having crests with a height lower than the radiation wavelength, and having antireflection features over the whole visible spectrum and over large ranges of the incidence angles are not known. Moreover, the purely diffractive nature of these surfaces over large ranges of the incidence angle and over a large radiation spectrum may cause undesired diffractive iridescence effects. Beside these difficulties, this solution has the further problems deriving from the large size and the complicated shape which are typical of a surface such as that of a car dashboard. The solution of surfaces having crests with a height which is a fraction of the radiation wavelength is therefore difficult to be used on the whole surface.

Moreover, in the case in which only antireflection features are requested, for example for components of plastic material, the zero order surfaces, or SWS are good only for a limited width of the wavelength spectrum and imply relevant technological complications.

SUMMARY OF THE INVENTION

The object of the present invention is that of overcoming the problems associated with the zero order surfaces or SWS, while achieving an antireflection behaviour over a large wavelength spectrum.

According to the invention, this object is achieved by using an antireflection high absorbtion surface for dielectric, conductive, semiconductor, ceramic, plastic and metal materials, said surface having roughness with a periodical or aperiodical profile, wherein the surface has a plurality of projections having a height which is an integer multiple of an incident light wavelength from 5 to 300 times the wavelength, so that the electromagnetic radiation is substantially absorbed mainly due to reflection, refraction and absorbtion phenomena and partially due to diffraction phenomena, said plurality of projections being comprised of a first group of projections alternating with a second group of projections with the first group of projections having a greater height than the second group of projections, wherein the surface has a profile with projections having a height/base ratio greater than 1 so that the radiation is compelled to be subject to an elevated number of reflections and wherein the surface has antireflection features at angles of incident light from 0 degrees to 60 degrees.

FIGS. 1, 2 and 3 of the annexed drawings diagrammatically show the conventional methods which can be used for providing a rough surface with a random profile and an additional textile-like looking treatment of the known type which has been mentioned above, which is commonly applied on motor-vehicle dashboards, as well as for providing a rough surface with a predetermined profile which is purely diffractive of the SWS type, with crests having a height which is a fraction of the radiation wavelength, and finally also for providing antireflection surfaces according to the present invention. FIG. 1 shows the provision of a rough surface 1 on one face of a plate 2 of plastics by means of a drawing operation between two counter-rotating cylinders 3, 4, the former of which has a toothed profile able to form the desired profile on the rough surface. FIG. 2 shows an operation similar to that of FIG. 1, in which the drawing operation is associated with a lamination of a support material 5 on the face of the plate 2 of plastic material which is opposite to the antireflection surface 1. FIG. 3 shows the case in which the body of plastics 2 is formed directly with the antireflection surface 1 by injection of plastic material through a channel 6 in the cavity defined between two elements 7, 8 of a mould.

While the methods for reproducing the antireflection surface are similar whatever is the adopted solution, the methods for obtaining the mould or the "master" which is used for the reproduction are different. In the case in which the surface has a conventional random roughness, the crests have heights and spacings which may vary from a fraction of the wavelength to many wavelengths and are generated with the conventional techniques used in photolitography, according to well known procedures. This is true also for the drawing operation, the laminating operation and the moulding. In case of purely diffractive projections of the SWS type, having a size lower than or similar to the wavelength, complicated and expensive technologies are requested such as holographic techniques, lithographic x rays techniques, accompanied by other techniques such as high resolution etching, plasma or ion techniques, etc. The complexity and the costs for the production of moulds or masters are higher if the wavelength is lower. Their use therefore is mainly oriented to wavelengths in the electromagnetic field up to the infrared, rarely to the visible spectrum. A further complexity derives from the size and shape of the components to be made, for which the manufacture by a drawing or lamination technique is easier, whereas the moulding of large and complex shapes, such as those of motor-vehicle dashboards is generally more difficult.

All said drawbacks are solved with the surface forming the subject of the present invention.

BRIEF DESCRIPTION OF THE DRAWINGS

Further features and advantages of the invention will become apparent from the description which follows with reference to annexed drawings, given purely by way of non limiting example, in which.

DETAILED DESCRIPTION OF THE INVENTION

As shown above, in the present invention the control of reflectivity is obtained through structures having projections with heights and spacings amounting to many wavelengths. The control of specular reflectivity is due to the partial absorbtion of the radiation at each reflection on the walls of the surface.

Figure 4:
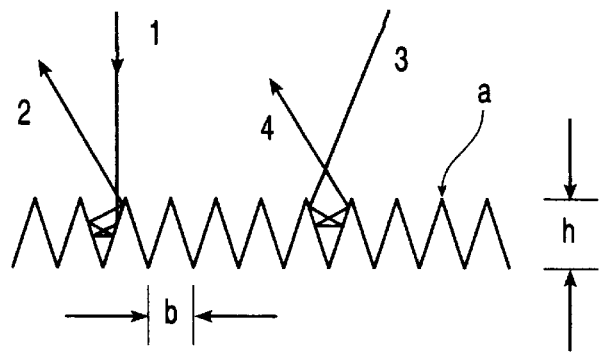
FIG. 4 shows the typical path of a light ray in a unidimensional structure having a profile with triangular projections.
Figure 5:
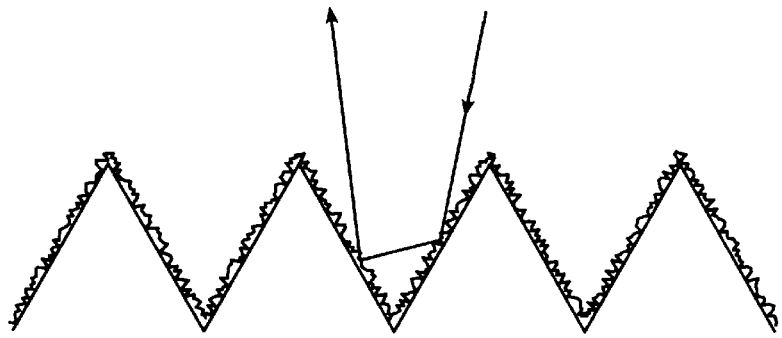
FIG. 5 shows a profile with triangular projections on which a random roughness is superimposed.

In FIG. 4 there is described the typical path of a ray in a unidimensional structure having a profile with triangular projections. A ray 1 directed orthogonally to the surface is subject to a number N of reflections which can be easily obtained if one knows the ratio between base b and height h of the triangular profile of each projection. At each reflection, the ray loses a portion of its energy. If the features of the material and the angles of the incident ray at each reflection are known, also the percentage of energy and the polarization status of the output ray 2 can be easily obtained. Once the minimum accepted value of specular reflectivity has been defined, also the profile of the surface and specifically the values of b and h can be defined. Similar consideration apply also when a ray 3 is directed at an angle to a direction orthogonal to the surface; also in this case the energy value of the output ray 4 depends from the features of the material and the number M of the reflections on the walls of the surface, which number depends from the profile of the surface and particularly from the values b and h. Since the angle of the incident ray with respect to a direction orthogonal to the surface is always very high in the case of a motor-vehicle dashboard, the residual random roughness which is visible in FIG. 5 over the triangular projections affects only to a minimum extent the overall value of the radiation subject to scattering, since with large incidence angles the value of the specularly reflected radiation prevails, which is mainly responsible for the visual disturbance which takes place for example in a motor-vehicle dashboard.

A possible problem which can be encountered with profiles of the type being discussed is due to the diffraction effects which may become noticeable particularly when the incident rays have a large angle with respect to the direction orthogonal to the surface and the periods amounts to a few wavelengths, such as from 5 to 20 times the radiation wavelength. In this case, although the value of specular reflectivity can be limited to a low value, undesired diffractive iridescence effects may take place. A first solution to this problem can be obtained by choosing periods and hence heights of the projections amounting to some tens of wavelengths, for example greater than 20 times the wavelength. A second solution can be obtained by varying the height of the projections within a single period when the latter has in particular a length from 5 to 20 wavelengths. Examples of this solution are described in the following with reference to FIGS. 6 and 7.

Figure 6:
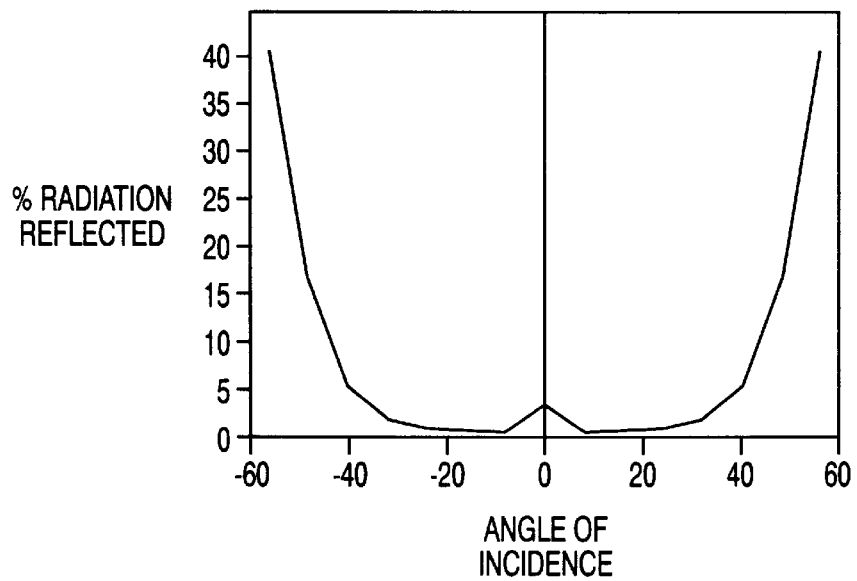
FIG. 6 is a diagram which shows the variation of reflectivity with the incidence angle of the light ray for an antireflection structure having pyramidal projections, according to the invention.

In FIG. 6 there is shown a diagram of the average reflectivity value calculated for the whole visible spectrum for angles of incident rays varying from −60° to +60°. The calculation relates to a surface with pyramidal projections formed by a smooth material. Similar results can be obtained with conical projections. The height of the pyramidal projections is 100 microns, i.e. about 200 wavelengths, with a height/base ratio being 2. The calculation relates to a surface of plastic material with a reflectivity of 0.2 at an angle of 0° of the incident light. This surface may be formed on a dark plastic material, such as that usually used in motor-vehicle dashboards, or can be made with different colour, such as red or green. The reflectivity value at large angles of incident light may be controlled in such a way that, for example, the colour of the base material of the dashboard remains visible without the light reflected by the windshield being of disturbance to the driver. A similar reflecting behaviour is obtained using a metal material. If the height/base ratio of the pyramidal projections is higher, the antireflection features which are obtained are improved. Similar diagrams can be obtained with height starting from a few wavelengths, such as 5 wavelengths. However, when the height is of only a few microns, the need of having a height/base ratio greater than 1 implies the presence of undesired refractive effects which are accentuated at high angles of incident light. As a matter of fact, a relevant portion of the radiation is close to the tips of the projections, where the refraction effects are higher.

Figure 7:
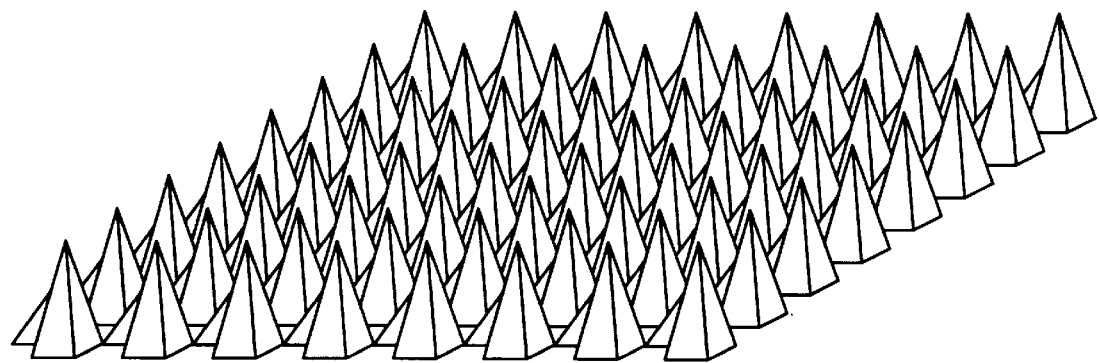
FIG. 7 is a computer drawing of an antireflection surface.

In FIG. 7 there is described a typical antireflection structure with projections having a height of a few wavelengths, which keep their features even at high angles of incident light, and irrespective from the azimuth angle of the incident radiation beam. By alternating pyramidal projections having different height, the undesired diffraction effect on the tips of the projections at high angles of incident rays is decreased. In this manner, the percentage of radiation close to the outermost tips is reduced. By such a measure, projections having a height of a few wavelengths can be used without generating iridescence effects. The reflectivity values remain lower than 1% even at angles of incident light of 60°.

Figure 8:
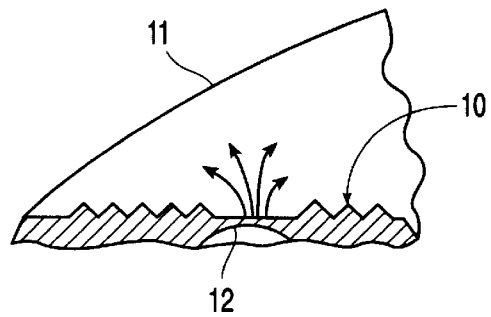
FIG. 8 is a diagrammatic cross sectional view of the surface of the motor-vehicle dashboard made according to the invention.

FIG. 8 shows the application of an antireflection structure to the specific case of a motor-vehicle dashboard. The antireflection surface may cover the whole dashboard 10 at the area below the windshield 11, or only the area close to the ventilation outlets 12, where the disturbance due to the specular reflection is higher.

Figure 9:
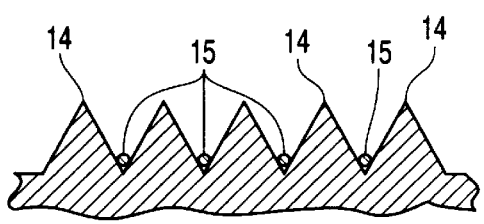
FIG. 9 shows the application of an antireflection structure according to the invention to a solar cell in order to maximize the absorbtion of solar radiation.

FIG. 9 shows the surface of a solar cell having projections 13 defining slots 14 therebetween on the bottom of which the wires which are commonly used in solar cells are received.

Figure 10:
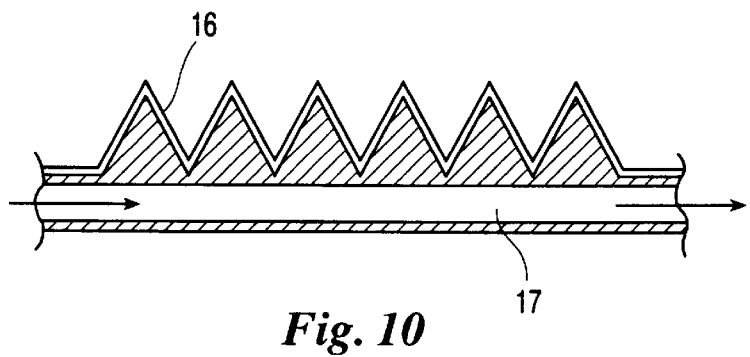
FIG. 10 is a diagrammatic view which shows the application of an antireflection structure according to the invention to a material having a high thermal conductivity, in order to absorb the solar radiation and convert the same into other forms of energy.

FIG. 10 shows the surface of a solar collector with a high thermal conductivity. The antireflection surface may be covered by a layer 16 of a semiconductor or polymeric material used to improve the absorbtion of solar radiation; the latter is trapped on the surface. The conductive panel is in contact with a cooling fluid which circulates through a passage 17.

Figure 1:
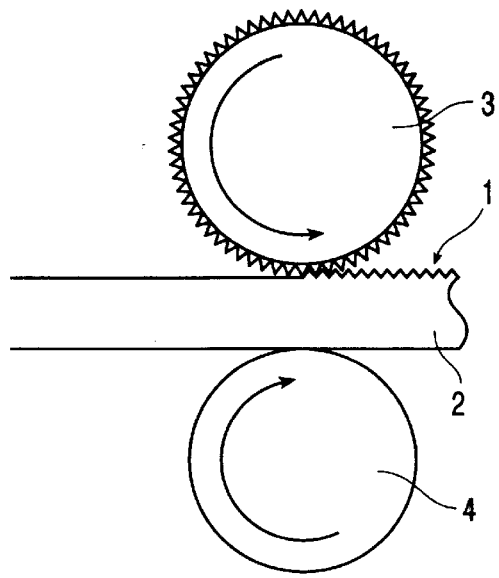
FIG. 1 is a diagrammatic view which shows a first method for providing a surface according to the invention.
Figure 2:
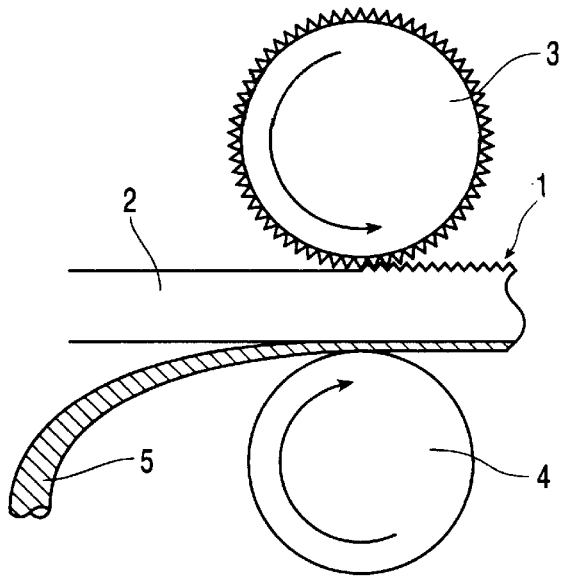
FIGS. 2, 3 show two alternative methods.
Figure 3:
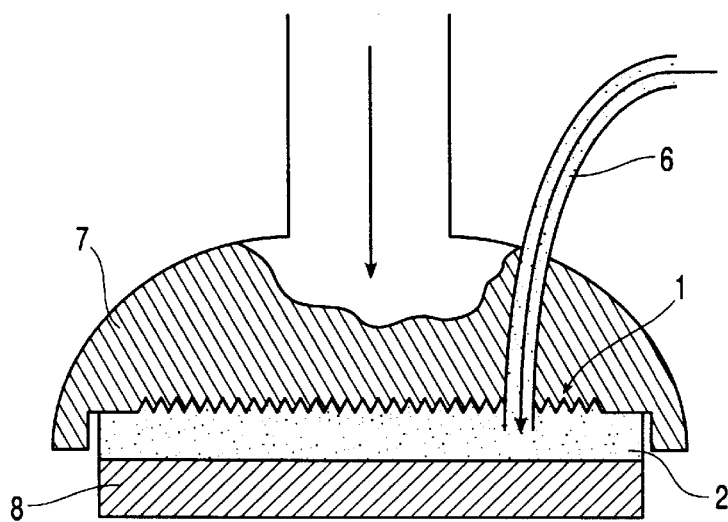

The production of the master or mould for the manufacture of the antireflection surface according to the invention may be obtained with the conventional techniques such as by machining, by photolitography, or by a litographic technique, by laser writing or also by the technology of the projection of masks irradiated by high power radiation beams to obtain the desired profile directly on the master or the mould or by evaporation or ablation of material. The profiles of the surface according to the present invention, including projections with heights and periods which are integer multiples of the wavelength generally enable an easy adaptation of many technologies to the production of master or directly of the moulds in order to obtain large and complicated shapes. The mass production of antireflection surfaces according to the invention can be made by the known technologies of injection moulding, an example of which has been shown in FIG. 3, or according to the drawing, or embossing technology shown in FIG. 1, or also according to the drawing technology described in FIG. 2 or according to the more conventional technology of heat or cold moulding.

Naturally, while the principle of the invention remains the same, the details of construction and the embodiments may widely vary with respect to what has been described and illustrated purely by way of example, without departing from the scope of the present invention.

What is claimed is:

1. An antireflection high absorbtion surface for dielectric, conductive, semiconductor, ceramic, plastic and metal materials, said surface having a roughness with a periodical or aperiodical profile, wherein the surface has a plurality of projections having a height which is an integer multiple of an incident light wavelength from 5 to 300 times the wavelength, so that the electromagnetic radiation is substantially absorbed primarily due to reflection, refraction and absorbtion phenomena and partially due to diffraction phenomena, said plurality of projections being comprised of a first group of projections alternating with a second group of projections with the first group of projections having a greater height than the second group of projections, wherein the surface has a profile with projections having a height/base ratio greater than 1 so that the radiation is compelled to be subject to an elevated number of reflections and wherein the surface has antireflection features at angles of incident light from 0 degrees to 60 degrees.

2. A component for a motor-vehicle passenger compartment, wherein the component has an antireflection surface as set forth in claim 1.

3. A motor-vehicle dashboard formed of coloured plastic material, wherein the dashboard has an antireflection surface according to claim 1.

4. An antireflection surface as set forth in claim 1, wherein the surface is obtained by drawing, embossing, laminating, injection moulding or the conventional hot or cold moulding operation.

5. A solar cell having a high absorbtion surface as set forth in claim 1.

6. A solar energy collector having a high absorbtion surface as set forth in claim 1, further comprising a semiconductor, ceramic or polymer coating.

* * * * *